July 7, 1959     D. V. LOUZOS     2,894,053
SOLID ELECTROLYTE BATTERY SYSTEM
Filed Sept. 8, 1955
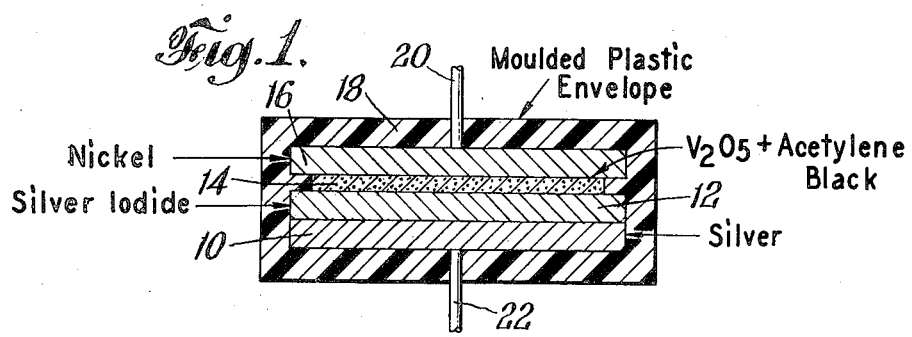
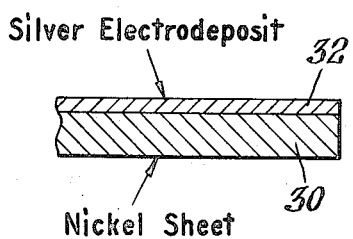
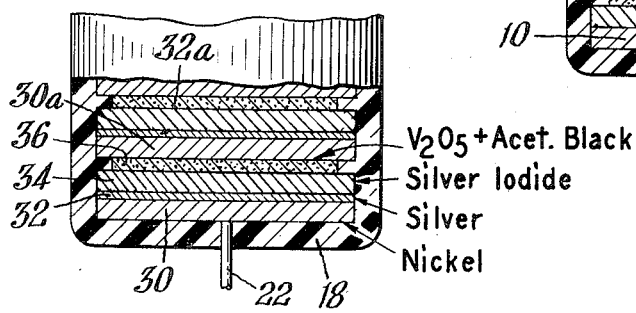
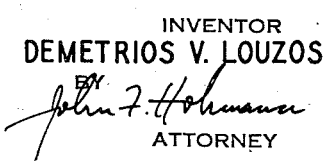
INVENTOR
DEMETRIOS V. LOUZOS
ATTORNEY United States Patent Office 2,894,053
Patented July 7, 1959

2,894,053

SOLID ELECTROLYTE BATTERY SYSTEM

Demetrios V. Louzos, Glenview, Ill., assignor to Union Carbide Corporation, a corporation of New York Application September 8, 1955, Serial No. 533,140

14 Claims. (Cl. 136—87)

This invention relates to electric cell and battery systems and refers more particularly to such systems having a solid electrolyte and to cells and batteries produced therefrom.

Conventional primary batteries of commerce all employ aqueous electrolytes of one kind or another. As a result of this, they all experience certain serious limitations. Perhaps the most important of these is deterioration during shelf storage due to the activity of the aqueous electrolyte with one or both of the electrodes. In the case of Leclanché cells, the shelf period is generally reckoned in terms of a year or eighteen months for the smaller size cells and up to several years for the larger ones. A second limitation of commercial primary batteries is the narrow temperature range over which they are operable. Electrical performance materially decreases with lower temperatures and only limited performance is attained in the vicinity of −40° F. with specially developed electrolytes. Likewise, the upper operable limit is found to be substantially under the boiling point of the electrolyte. Still a third limitation of the conventional primary batteries is their tendency to leak. This can be a prohibitive limitation in battery applications where even trace leakage must be avoided.

Disadvantages such as these just discussed have not escaped the attention of the art. Considerable effort has been expended in attempts to overcome them. One of the directions in which such efforts have been aimed is a non-aqueous system in which all of the essential elements of the cell are in the solid state. Some operative cells of this type have been produced, but they, too, suffer from disadvantages. For example, in one system, one of the cell elements is a gas film maintained on a metal surface. Cells in this system do not possess a satisfactorily long shelf life because the gas film tends to migrate from its desired location. In another system, a voltage is produced only at very high temperature. And in still another system, the cell breaks down at elevated temperature.

It is the principal object of this invention to provide a cell having a solid, non-aqueous electrolyte. More specifically, it is an object of the invention to provide a primary galvanic cell all the essential elements of which are in the solid state, which cell will have a prolonged shelf life and which is stably operable over an extremely wide temperature range. Another object is the provision of such a cell which is adaptable to easy assembly into a battery capable of producing high voltage.

These objects are achieved by the invention which will be described with reference to the accompanying drawing in which:

Fig. 1 is a vertical section of a single cell embodying the invention;

Fig. 2 is a vertical section of a battery made up of a stack of cells of the type shown in Fig. 1;

Fig. 3 is a somewhat diagrammatic sectional view of a duplex electrode suitable for use in a cell embodying the invention; and Fig. 4 is a vertical section, part being broken away, of a battery embodying the invention and containing electrodes of the type illustrated in Fig. 3.

Broadly, the invention comprises an electric cell having a metal anode, a solid ionically conductive silver halide electrolyte, and a depolarizing oxide composed of an oxide of a polyvalent metal in a higher valence state. The anode metal of the cell of the invention may be silver, zinc, magnesium, copper, lead aluminum, or any metal higher than silver in the electromotive series. Of all of these metals, silver is presently preferred. The silver halide may be silver iodide, silver bromide, or silver chloride or mixtures thereof in either the normal crystalline condition or in translucent sheet form referred to herein as the "horn" or "horny" condition. Of these, silver iodide horn is preferred. The horny form is generally preferable because it is more conductive and also makes possible a more intimate contact between cell elements. The depolarizing oxide may be, for example, vanadium pentoxide, tungstic oxide, manganese dioxide, nickel oxide, silver oxide (AgO or $Ag_2O$), lead dioxide or ceric oxide. Of these vanadium pentoxide is preferred. Preferably, an inert electrically conductive, finely divided material, for instance, acetylene black, is mixed with the depolarizing oxide to improve its conductivity.

A preferred cell embodying the invention is of the system silver/silver iodide (horn)/vanadium pentoxide. For conciseness, the invention will be discussed herein with particular reference to this system unless otherwise indicated.

Referring to the drawing, a cell embodying the invention is illustrated in vertical section in Fig. 1. The cell comprises a silver anode 10, silver iodide electrolyte 12 adjacent thereto and in contact therewith, a depolarizer mix 14 composed of vanadium pentoxide and acetylene black, and a cathode collector member 16 composed of nickel. The cell elements are encased in a plastic envelope 18 preferably molded thereabout. Terminal leads 20, 22 are attached to the anode 10 and cathode collector 16. As shown in Fig. 2, a battery may comprise a stack of a number of cells such as that shown in Fig. 1, all contained within a plastic envelope 18.

For battery purposes, however, a duplex electrode such as that shown in Fig. 3 is generally more desirable. As there shown, a nickel sheet may have a layer 32 of silver thereon, suitably there produced by electrodeposition. When a duplex electrode is utilized in a battery assembly, the silver layer 32 is the anode for one cell and the nickel layer 30 the cathode collector for the adjacent cell as shown in Fig. 4. For example, the duplex electrode may be placed with the nickel layer 30 down, the silver layer 32 up. The electrolyte 34, silver iodide, is adjacent to and in contact with the silver layer 32, and the depolarizer mix 36 is next above the electrolyte 34 and in contact with it. The cell is completed by the nickel layer 30a of the next duplex electrode, the silver layer 32a of which is the anode for the next cell. The cells are so stacked until a battery of desired size is obtained. The completed battery is, of course, placed in a suitable container 18 and provided with leads 20, 22.

Cells embodying the invention are not difficult to manufacture. For instance, onto a sheet of silver suitably supported may be placed a layer of silver iodide powder. The silver iodide layer is made as level as possible and the depolarizer mix composed of commingled comminuted vanadium pentoxide and acetylene black placed upon it. Next, a sheet of nickel is placed upon the depolarizer layer. In accordance with the preferred procedure, a plastic envelope is formed about the cell elements which are held in a suitable mold, for instance, one similar to that used for mounting metallographic specimens. A convenient material for the envelope is a methyl methacrylate resin. Generally, any of the moldable resin commercially available, such as the vinyl resins, styrene resins and phenolic resins, may be used.

As was stated above, it is preferred that the electrolyte be in the "horny" condition in the cell of the invention. The silver halide powder used may be converted to this condition by subjecting it to high pressure at room temperature or to somewhat lower pressure at elevated temperature. In a preferred method of making cells, according to the invention, such conversion is accomplished simultaneously with cell assembly, for instance, by subjecting the assembly to a pressure of about 8 tons per square inch at a temperature of about 150° C.

For convenience in handling the various elements of a cell in its manufacture, prepressed composite elements may be used. For instance, silver iodide powder may be pressed on a silver disc and powdered depolarizer mix pressed upon a nickel disc. The two compacts may then be placed with the silver iodide and the depolarizer mix in contact with each other and a plastic envelope molded about the assembly as above described.

The individual elements of the cell may, of course, be produced in other ways. For example, silver iodide may be deposited upon a silver sheet from solution in liquid ammonia or ethylene diamine. The depolarizer mix may be applied to a nickel sheet as a "paint," that is, a suspension of the comminuted mix in a suitable organic vehicle. The two composite members may then be placed in contact with each other, the silver iodide layer being in juxtaposition with the depolarizer mix, and sufficient pressure applied to bond them together and to convert the iodide to the horn state. As above indicated, heat may be applied at this point to make the conversion take place at lower pressure. By this procedure, a complete cell is produced and a number of such cells may be stacked to form a battery of the type shown in Fig. 2.

Similarly, to the silver side of the duplex electrode illustrated in Fig. 3, may be applied silver iodide and to the nickel side may be applied depolarizer mix. There is thereby produced a composite member containing elements of two half cells, and these composites may be stacked to form a battery of the type illustrated in Fig. 4.

A large number of cells about 1 inch in diameter and 0.035 inch thick with an electrode area of about 0.6 square inch embodying the invention in the silver/silver iodide/vanadium pentoxide system have been made by the procedures described and subjected to a variety of tests. By such tests, it has been determined that the cells are operable over the temperature range $-75°$ F. to at least 200° F. Currents in the range of 1 to 10 microamperes have been obtained over the temperature range of $-30°$ F. to 120° F. without more than a $\pm 5$ percent variation in nominal cell potential of about 0.45 to 0.55 volt. Cells have performed on continuous discharge at drains of $5 \times 10^{-11}$ and $5 \times 10^{-10}$ amperes at $-40°$ F. for a period of more than a week without dropping below 5 percent of the initial potential. Continuous discharge on a drain of $1.6 \times 10^{-10}$ amperes at room temperature has been in progress for one month with no drop in potential. Cells have also been discharged on intermittent tests both at room temperature and at $+165°$ F. on drains of from 1 to 24 microamperes. The 1 microampere drain tests were carried out by discharging the cells for 2 minutes per day for 5 days per week. Capacities to an arbitrarily selected 15 percent voltage drop end point were 58 minutes (29 discharges over a period of about six weeks) at room temperature and in excess of 82 minutes (41 discharges over a period of eight weeks) at $+165°$ F. In the latter test, the cell voltage had not fallen below the cutoff voltage after 41 discharges.

A number of cells have been produced and tested in systems other than the silver/silver iodide/vanadium pentoxide system. Typical open circuit voltages measured at room temperature in such tests are set forth in the following table by way of example.

| Cell system: | Voltage |
|---|---|
| $Zn/AgI/V_2O_5$ | 0.70 |
| $Mg/AgI/V_2O_5$ | 0.81 |
| $Cu/AgI/V_2O_5$ | 0.70 |
| $Pb/AgI/V_2O_5$ | 0.70 |
| $Al/AgI/V_2O_5$ | 0.72 |
| $Fe/AgI/V_2O_5$ | 0.61 |
| $Cd/AgI/V_2O_5$ | 0.70 |
| $Ag/AgI/PbO_2$ | 0.69 |
| $Ag/AgI/MnO_2$ | 0.65 |
| $Ag/AgI/NiO_2$ | 0.62 |
| $Ag/AgI/Ni_2O_3$ | 0.52 |
| $Ag/AgI/AgO$ | 0.12 |
| $Ag/AgI/CeO_2$ | 0.58 |

It will be observed from the discussion and data above given that the invention provides cell systems capable of producing substantial voltages over wide variations in temperature. The cells are not only substantially insensitive to temperature changes but also are not affected by moisture conditions, having no hygroscopic or deliquescent materials initially or as reaction products. Cells embodying the invention show evidence of prolonged shelf life without deterioration, even at very high temperatures. The current yielded by the cells, though small, is significant and sufficient for uses such as charging capacitors and maintaining them in the charged condition.

Among general advantages of solid, non-aqueous systems are the fact that leakage is eliminated as a problem and the fact that in a battery of cells the electrolyte can be confined exclusively to the areas in which it belongs. Cells embodying the invention partake of these advantages as well as those enumerated previously.

Although specific details of cell construction have been given herein by way of example, it will be apparent to those skilled in the art that various modifications may be made. For instance, the battery constructions shown comprise a series ararngement, but the cells of the invention may, of course, be arranged in parallel or series-parallel fashion as many be desired.

I claim:

1. A substantially nonaqueous electric cell having a metal anode composed of a metal selected from the group consisting of silver and metals above silver in the electromotive series of the elements, a solid, ionically, conductive silver halide electrolyte and a depolarizer mix comprising an oxide of a polyvalent metal in a higher valence state.

2. A substantially nonaqueous primary cell having a metal anode composed of a metal selected from the group consisting of silver and metals above silver in the electromotive series of the elements, a solid, ionically, conductive silver halid electrolyte, and a depolarizer mix comprising an oxide of a polyvalent metal in a higher valence state.

3. A substantially nonaqueous primary cell having a metal anode composed of a metal selected from the group consisting of silver and metals above silver in the electromotive series of the elements, a solid, ionically conductive silver halide electrolyte in the horn state, and a depolarizer mix comprising an oxide of a polyvalent metal in a higher valence state.

4. A substantially nonaqueous primary cell having a metal anode composed of a metal selected from the group consisting of silver and metals above silver in the electromotive series of the elements, a solid, ionically conductive silver iodide electrolyte, and a depolarizer mix comprising an oxide of a polyvalent metal in a higher valence state.

5. A substantially nonaqueous primary cell having a metal anode composed of a metal selected from the group consisting of silver and metals above silver in the electromotive series of the elements, a solid, ionically conductive silver iodide electrolyte in the horn state, and a depolarizer mix comprising an oxide of a polyvalent metal in a higher valence state.

6. A substantially nonaqueous primary cell having a silver anode, a solid, ionically conductive silver halide electrolyte, and a depolarizer mix comprising an oxide of a polyvalent metal in a higher valence state.

7. A substantially nonaqueous primary cell having a silver anode, a solid, ionically conductive silver halide electrolyte in the horn state, and a depolarizer mix comprising an oxide of a polyvalent metal in a higher valence state.

8. A substantially nonaqueous primary cell having a silver anode, a silver iodide electrolyte in the horn state, and a depolarizer mix comprising an oxide of a polyvalent metal in a higher valence state.

9. A substantially nonaqueous primary cell having a silver anode, a silver iodide electrolyte in the horn state, and a depolarizer mix comprising vanadium pentoxide.

10. A substantially nonaqueous primary cell having a silver anode, a silver iodide electrolyte in the horn state, and a depolarizer mix comprising manganese dioxide.

11. A substantially nonaqueous primary cell having a silver anode, a silver iodide electrolyte in the horn state, and a depolarizer mix comprising tungstic oxide.

12. A substantially nonaqueous battery composed of a stack of cells each of which has a metal anode composed of a metal selected from the group consisting of silver and metals above silver in the electromotive series of the elements, a solid, ionically conductive silver halide electrolyte and a depolarizer composed of an oxide of a polyvalent metal in a higher valence state, said battery being encased in a plastic envelope.

13. A substantially nonaqueous primary cell having a silver anode, a solid silver iodide electrolyte, and a depolarizer mix comprising an oxide of a polyvalent metal in a higher valence state and in admixture therewith finely-divided, inert, electrically conductive material.

14. A substantially nonaqueous primary cell having a silver anode, a silver iodide electrolyte in the horn state, and a depolarizer mix composed of vanadium pentoxide and acetylene black.

References Cited in the file of this patent

UNITED STATES PATENTS

| | | |
|---|---|---|
| 2,475,153 | Rock | July 5, 1949 |
| 2,667,405 | Muller et al. | Jan. 26, 1954 |
| 2,678,343 | Daniel | May 11, 1954 |
| 2,689,876 | Lehovec | Sept. 21, 1954 |
| 2,690,465 | Broder | Sept. 28, 1954 |
| 2,696,513 | Lehovec | Dec. 7, 1954 |
| 2,718,539 | Bradshaw et al. | Sept. 20, 1955 |